US010866192B2

(12) United States Patent
Löbbert (10) Patent No.: US 10,866,192 B2
(45) Date of Patent: Dec. 15, 2020

(54) OPTOCHEMICAL SENSOR UNIT AND A METHOD FOR THE QUALITATIVE AND/OR QUANTITATIVE DETERMINATION OF AN ANALYTE IN A MEASURING MEDIUM WITH THE SENSOR UNIT

(71) Applicant: Endress+Hauser Conducta GmbH+Co. KG, Gerlingen (DE)

(72) Inventor: Andreas Löbbert, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/654,288

(22) Filed: Oct. 16, 2019

(65) Prior Publication Data

US 2020/0124537 A1 Apr. 23, 2020

(30) Foreign Application Priority Data

Oct. 19, 2018 (DE) .......................... 10 2018 126 082

(51) Int. Cl.
*G01N 21/77* (2006.01)
*G01N 21/64* (2006.01)

(52) U.S. Cl.
CPC ....... *G01N 21/7703* (2013.01); *G01N 21/643* (2013.01); *G01N 2021/7786* (2013.01)

(58) Field of Classification Search
CPC ........... G01N 21/75–77; G01N 21/643; G01N 21/754; G01N 21/757; G01N 21/758; G01N 21/766; G01N 21/775; G01N 21/7703; G01N 21/7753; G01N 21/7763; G01N 21/7786; G01N 2021/6428; G01N 2021/6432

USPC ........................................................... 385/12
See application file for complete search history.

(56) References Cited

U.S. PATENT DOCUMENTS

| 6,325,973 | B1* | 12/2001 | Leland | ................... | C07H 21/00 |
| | | | | | 204/298.16 |
| 6,645,777 | B1* | 11/2003 | Letcher | ............. | G01N 21/6428 |
| | | | | | 356/244 |
| 8,557,604 | B2* | 10/2013 | Song | .................. | G01N 33/5302 |
| | | | | | 436/514 |
| 8,927,294 | B2* | 1/2015 | Ran | ..................... | G01N 21/6456 |
| | | | | | 436/164 |
| 9,897,599 | B2* | 2/2018 | Kanayama | ......... | G01N 21/7703 |

(Continued)

*Primary Examiner* — Robert Tavlykaev
(74) *Attorney, Agent, or Firm* — Christopher R. Powers; Endress+Hauser (USA) Holding Inc.

(57) ABSTRACT

An optochemical sensor unit including: an optical waveguide; a transmitting unit for emitting a first transmission signal for exciting a luminophore; a receiving unit for receiving a received signal comprising a signal component emitted by the excited luminophore; a measuring chamber for receiving a fluid, wherein the fluid includes magnetic microspheres; a membrane arranged between the measuring chamber and a measuring medium for exchanging an analyte between the measuring medium and the fluid in the measuring chamber, wherein the measuring diaphragm is impermeable to the magnetic microspheres; and an electromagnet for attracting magnetic microspheres to a sensor membrane with a fluid-contacting surface and/or to a fluid-contacting surface of the optical waveguide, or to a surface of a transparent substrate layer of the optical sensor unit that is connected to the optical waveguide.

21 Claims, 5 Drawing Sheets

(56) References Cited

U.S. PATENT DOCUMENTS

| | | | |
|---|---|---|---|
| 2006/0175555 A1* | 8/2006 | Lau | G01J 3/0286 |
| | | | 250/486.1 |
| 2010/0310423 A1* | 12/2010 | Nieuwenhuis | G01N 33/54366 |
| | | | 422/82.05 |
| 2011/0045506 A1* | 2/2011 | Lee | C09B 19/00 |
| | | | 435/7.92 |
| 2013/0141726 A1* | 6/2013 | Van Lieshout | G01N 21/55 |
| | | | 356/436 |
| 2015/0034807 A1* | 2/2015 | Lobbert | G01J 1/44 |
| | | | 250/214.1 |
| 2015/0068898 A1* | 3/2015 | Fanselow | G01N 27/40 |
| | | | 204/415 |
| 2017/0176375 A1* | 6/2017 | Lobbert | G01N 27/40 |
| 2019/0025210 A1* | 1/2019 | Neijzen | G01N 33/54326 |
| 2020/0150046 A1* | 5/2020 | Kraemer | G01N 21/47 |

* cited by examiner

OPTOCHEMICAL SENSOR UNIT AND A METHOD FOR THE QUALITATIVE AND/OR QUANTITATIVE DETERMINATION OF AN ANALYTE IN A MEASURING MEDIUM WITH THE SENSOR UNIT

CROSS-REFERENCE TO RELATED APPLICATION

The present application is related to and claims the priority benefit of German Patent Application No. 10 2018 126 082.2, filed on Oct. 19, 2018, the entire contents of which are incorporated herein by reference.

TECHNICAL FIELD

The present disclosure relates to an optochemical sensor unit and a method for the qualitative and/or quantitative determination, with the aforementioned sensor unit, of an analyte in a measuring medium.

BACKGROUND

The use of magnetic microspheres in a measuring medium is known per se. It is thereby problematic that a comparatively strong magnetic field is required to draw microspheres out of a measuring medium.

SUMMARY

Based on this preliminary consideration, it is the object of the present disclosure to provide a sensor unit for the use of magnetic microspheres, which sensor unit may be operated with low energy expenditure.

The present disclosure achieves the present object via the subject matter of claim 1 and via a method having the features of claim 15. Advantageous embodiments of the present disclosure are the subject matter of the dependent claims.

An optochemical sensor unit according to the present disclosure comprises an optical waveguide, a transmitting unit for emitting a first transmission signal for exciting a luminophore, and a receiving unit for receiving a received signal comprising a signal component emitted by the excited luminophore.

The optochemical sensor unit is used for qualitative and/or quantitative determination of an analyte in a measuring medium. The analyte may be previously converted into a sensor-active substance. This can preferably be accomplished catalytically or enzymatically. The sensor-active substance can then attach as quencher to the luminophore and reduce the luminescence, especially the fluorescence.

The optical waveguide can typically be designed as a fiber bundle. The optical waveguide is provided especially for signal transmission of the transmission signal and the received signal. The transmitted signal is especially a light signal which can be emitted by a signal source, especially a light source, for example an LED.

The receiving unit may be a photodiode. The principle of fluorescence quenching can preferably be used as the measuring principle of the sensor; however, the excitation of fluorescence is merely a variant of the measuring principle. The received light signal comprises a portion of excited radiation, for example fluorescent radiation.

The sensor unit has a measuring chamber for receiving a fluid, wherein the fluid comprises magnetic microspheres. The fluid can, for example, be a solvent, for example water, with the microspheres. The measuring chamber is preferably a closed space with respect to a measuring medium.

The measuring chamber has a membrane which is arranged between the measuring chamber and the measuring medium and which is provided for exchanging an analyte between the measuring medium and the fluid in the measuring chamber. The membrane is thus analyte-permeable.

The membrane is impermeable to the magnetic microspheres. It is microsphere-impermeable.

The present disclosure differentiates between the aforementioned membrane and
a sensor membrane. The sensor membrane, insofar as it is present at all, is not a medium-contacting membrane and thus is not in contact with the measuring medium, but rather is a fluid-contacting membrane. It is thus in contact with the fluid in the measuring chamber. Because the sensor unit can also be sold or stored with an unfilled measuring chamber, within the scope of the present disclosure the sensor unit is, however, protected independently of whether or not the fluid is arranged in the measuring chamber.

Instead of the sensor membrane, however, a transparent or translucent wall without further layers, or directly an optical waveguide, can also be provided. In this instance, the aforementioned wall can be designed analogous to an uncoated substrate layer of a sensor membrane, for example as a glass or quartz glass window.

The wall or the substrate layer as part of a sensor membrane can preferably be formed as a transparent or translucent and conductive layer of silicon oxide, indium tin oxide, graphene fibers, titanium oxide, tungsten oxide, zinc oxide, tin oxide, vanadium oxide, and/or gallium oxide, or have such a layer.

The sensor unit has an electromagnet which is provided to attract magnetic microspheres to the aforementioned sensor membrane or wall with fluid-contacting surface, and/or to an optical waveguide with fluid-contacting surface.

The measuring chamber provides a defined space in which the microspheres can come into contact with the analyte. The microspheres can then be attracted by a magnetic field of low strength. Moreover, during the measurement a higher intensity can be achieved via the accumulation of the microspheres along the surface.

Advantageous embodiments of the present disclosure are the subject matter of the dependent claims.

It is advantageous if the optochemical sensor unit comprises a control unit for controlling the electromagnet, wherein the control unit is designed to control the electromagnet between an activated and deactivated state such that microspheres are attracted in the activated state and are not attracted in the deactivated state.

A deactivated state is thereby to be understood to mean that the electromagnet also produces a repulsion of the microspheres, for example via polarity reversal. However, it is thereby difficult to achieve optimal homogeneity of the microspheres in the fluid within the measuring chamber. It is therefore especially advantageous if there is intermittently no magnetic field in the measuring chamber.

In the measuring operation of the sensor unit, however, it is advantageous if the microspheres are attracted by the electromagnet.

The electromagnet can advantageously be arranged around an optical waveguide or in the optical waveguide, especially in a fiber bundle of the optical waveguide. In the first variant, the electromagnet can be in the form of a coil which is arranged, especially wound, around the optical waveguide. Alternatively, the electromagnet may also be formed as one or more magnetic fibers. The magnetic fiber may be a magnetizable fiber. If a plurality of magnetic fibers is present, they may include magnetizable fibers. These fibers can be arranged between the light-conducting fibers of a fiber bundle of an optical waveguide.

The electromagnet can alternatively or additionally be arranged in or on a sensor membrane. The electromagnet can preferably be arranged as a flat coil which can be designed as a single layer, for example as a coil printed onto a substrate of the sensor membrane.

The sensor membrane may be designed as a substrate layer, preferably as a layer of silicon oxide, titanium oxide, tungsten oxide, zinc oxide, tin oxide, vanadium oxide, and/or gallium oxide. The substrate is preferably transparent to the transmitting and/or receiving signal.

The sensor membrane can comprise further layers, for example an analyte-sensitive layer which is arranged on the fluid side of the substrate layer. This analyte-sensitive layer comprises a luminophore.

Further optional layers are a reflection layer, diffusion barrier layer, and/or an optically insulating layer, a fluid-contacting cover layer, and, where appropriate, one or more adhesion promoter layers.

The electromagnet can be designed as a flat coil, preferably with a rectangular or spiral configuration. The flat coil can be part, especially a layer, of the aforementioned sensor membrane.

The measuring chamber can preferably have an inlet and an outlet for exchanging the fluid in the measuring chamber so that microspheres, in which an embedded or attached enzyme or an embedded or attached luminophore are consumed, can be exchanged.

The sensor unit can have an agitation device to homogenize the magnetic microspheres in the fluid within the measuring chamber. Parts of the agitation device, for example a permanent magnet, which can be operated by an agitator can advantageously be arranged in the measuring chamber. If undesired interactions with the magnetic microspheres occur, purely mechanical agitators can also be used as agitation devices.

The sensor unit can also have a metering and/or injection device for the metered addition of fluid into the measuring chamber, and/or for adjusting the concentration of microspheres in the fluid within the measuring chamber. It is thus also possible to meter a plurality of different microspheres, for example separately with enzymes and analyte-sensitive agents. For example, only one solvent for the fluid can be supplied via the supply line, and the microparticles can be metered in via the metering device.

As a magnetic substance, the microspheres may comprise a ferromagnetic material, preferably a material selected from a group comprising: elemental iron, cobalt, and/or nickel; nickel salts, cobalt salts, and/or iron salts; rare earth magnets, especially neodymium iron boron, samarium cobalt, samarium iron nitrogen alloys; strontium ferrites; and/or ferritic materials.

The magnetic substance may be arranged as a core of the microsphere, whereas a luminophore or a catalyst or an enzyme may be provided in a coating of the core.

The microspheres preferably have at least one agent for converting the analyte into a sensor-active substance, preferably an enzyme and/or a catalyst, especially platinum.

The microspheres may comprise an analyte-sensitive material for detecting the analyte, or may comprise an analyte-sensitive material for detecting a sensor-active substance obtained by conversion of the analyte. This can preferably be a luminophore-containing material, especially preferably a material comprising a fluorescent agent.

The microsphere may additionally comprise a capsule layer made of a natural material or of a synthetic polymer.

Furthermore according to the present disclosure is a method for qualitatively and/or quantitatively determining an analyte in a measuring medium using a sensor unit according to the present disclosure, comprising the following steps:

introduction, into the measuring chamber, of a fluid comprising magnetic microspheres having at least one agent for converting the analyte into a sensor-active substance, and/or having an analyte-sensitive material for detecting the analyte or a substance converted from the analyte;

at least in certain regions, introduction of the sensor unit into a measuring medium, at least with the medium-contacting surface of the membrane;

activation of the electromagnet so that the microspheres accumulate on a sensor membrane with a fluid-contacting surface and/or at a fluid-contacting surface of an optical waveguide;

determination of a measurement signal while the microspheres have accumulated on the fluid-contacting surface.

After a single or repeated sequence of the aforementioned steps, a calibration can take place by introducing the opto-chemical sensor unit into a fitting, or by temporarily sealing the analyte-permeable and microsphere-impermeable membrane which terminates the measuring chamber. This calibration can preferably take place as an in situ calibration in the pipeline.

Further embodiment variants of the present disclosure are explained in more detail below.

The control unit can be part of a measuring transducer, control electronics, and/or a power supply. The aforementioned elements can be part of the sensor unit or part of a measuring device with the sensor unit.

The sensor unit and the remaining components of the measuring device can be coupled to one another via a galvanically isolated connection, especially an inductive plug-in connector coupling and/or a radio connection.

The energy for supplying the sensor unit can preferably be transmitted unidirectionally from further parts of a superordinate unit to the sensor unit via the galvanically isolated connection. The superordinate unit and the sensor unit thus form a measuring arrangement according to the present disclosure.

The microspheres may especially be obtained from a natural product and/or a biopolymer.

The microsphere may contain a filler derived from natural materials. This filler may contain a reaction-accelerating substance, that is to say an agent for converting the analyte, for example enzymes.

The particle size of the microspheres may preferably be in a range between 1 and 1000 μm, insofar as an agent for converting the analyte is embedded.

The particle size of the microspheres may preferably be in a range between 1 and 100 μm, provided that a sensor-specific dye or a luminophore is embedded.

The microspheres may contain additives for encapsulation, such as tocopherol or cholesterol, made of vegetable and animal components. The additives are preferably harmless according to the FDA and/or GRASS, and preferably contain no volatile components.

The aforementioned sensor membrane may include a polymer matrix, a luminophore, and a substrate. Further layers may optionally be provided in the sensor membrane, for example a layer having an optical insulator, a reflection layer, a diffusion-determining layer, or a hygienic layer.

The enzymes can be separately encapsulated in microspheres and contain magnetic particles, and be freely movable within the measuring chamber.

One or more of the microspheres may be provided with a magnetic substance in the core and enzyme and/or indicator dye at the surface. The terms luminophore and indicator dye are to be understood as synonymous within the scope of the present disclosure.

The electromagnet and the luminophore may respectively be embedded in a polymer. This is also referred to as an "embedding matrix." The embedding matrix may preferably be a polymer having reactive functional groups. Within the scope of the present disclosure, for oxygen sensors, silicones are a preferred class of polymer having such groups. For sensors with enzyme-containing layers, water-permeable polymers are preferred, preferably such as polyurethanes, acrylamides, acrylates, and/or methacrylates.

As an alternative to the sensor membrane, the sensor can have a transparent or translucent wall, for example. This wall has a surface facing toward the measuring chamber, which surface can come into contact with the fluid comprising the microspheres.

However, a sensor membrane with the aforementioned transparent or translucent wall is preferably used which represents a substrate layer and which is provided with an analyte-sensitive layer and/or further layers, wherein these layers then have a surface which can come into contact with the fluid comprising the microspheres.

As stated, only the transparent and/or translucent wall may also be present, on which wall further layers may, however, optionally be arranged, especially the aforementioned analyte-sensitive layer.

Furthermore, sensor-specific microspheres comprising an encapsulation material with magnetic material and an analyte-sensitive agent, especially luminophore, can be present in the fluid, wherein the magnetic encapsulation materials are held in the region of the optical waveguide and/or the sensor membrane by a magnetic attractive force at least during a measurement interval.

Alternatively, for example in the event of an optical pH measurement, a reference dye, for example a phosphorophore, can also be contained in the sensor membrane in addition to the indicator dye, for example a fluorophore.

The sensor-specific components thus do not or do not all need to be contained in the sensor membrane, but can preferably be contained in the microspheres which are loaded with magnetic particles.

These sensor-specific components are especially at least one analyte indicator in the form of a luminophore and/or at least one activator, for example an enzyme, for converting the analyte into a substance which can be measured by the sensor or a sensor-active substance.

Furthermore, the microspheres can contain at least one protective material for the sensor-specific indicator dye. However, the protective material can also be provided for protecting the enzyme.

The protective material may be in the form of a protective layer which is arranged around the capsule material of the microsphere. The surrounding protective material may be an elastomer or a thermoplastic elastomer. Thermoplastics can also be used both as filling or wrapping material for the microspheres.

To provide the microspheres, a natural product, for example spores, can be relieved of internal constituents via hydrolysis. The resulting hollow bodies are used as capsule material for the microspheres. For example, a magnetic material may be incorporated in the interior of the encapsulation material, and an enzyme or luminophore may be arranged along the outer surface. However, other variants for attachment are also conceivable.

The inflow and/or outflow of fluid in the measuring chamber can be monitored by a flow measuring device.

By sealing the measuring chamber of the sensor unit, an in situ calibration in the process may be enabled via a bypass.

A measuring arrangement according to the present disclosure comprises an optochemical sensor unit according to the present disclosure and a superordinate unit connected to the optochemical sensor unit, especially a measuring transducer or a control electronics unit and/or a power supply, wherein the optochemical sensor unit and the superordinate unit are coupled to one another via a connection, especially a releasable connection, preferably an inductively coupling plug connector coupling and/or a radio connection; and wherein power is transmitted unidirectionally from the superordinate unit to the optochemical sensor unit via the connection.

The connection can advantageously be a galvanically isolated connection.

The superordinate unit can advantageously comprise a data processing unit, wherein additional data, especially the measurand, are transmitted bidirectionally between the optochemical sensor unit and the superordinate data processing unit via the connection.

BRIEF DESCRIPTION OF THE DRAWINGS

Further advantages, features and details of the present disclosure will become apparent from the following description, in which an exemplary embodiment of the present disclosure is explained in more detail with reference to the drawing. The person skilled in the art will expediently also consider the features disclosed in combination in the drawing, the description and the claims individually and combine them into reasonable further combinations. In the drawings:

DETAILED DESCRIPTION

Hereinafter, an optical sensor 1 according to the present disclosure will be described using examples with reference to a possible embodiment. The features, technical effects, and advantages mentioned in this context can of course also be transferred to other optical or optochemical sensors.

Figure 1:
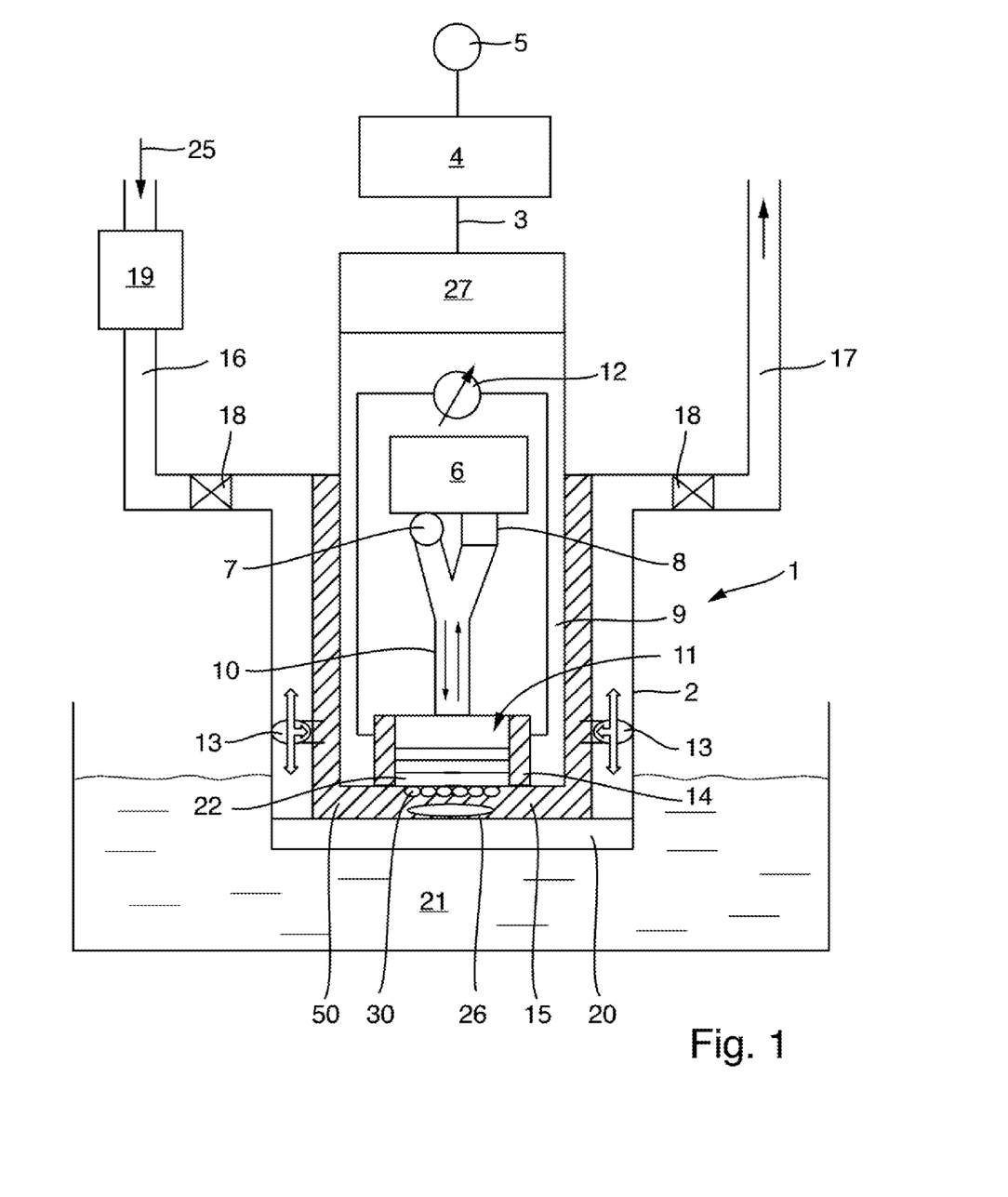
FIG. 1 shows a schematic representation of an optochemical sensor according to the present disclosure.

FIG. 1 shows an optochemical sensor unit 1, which can also be referred to as an optical sensor or as an optical sensor unit.

The measuring principle of the optochemical sensor unit 1 is based on the principle of fluorescence quenching, and is explained in more detail below with reference to the determination of a concentration of dissolved oxygen in the measuring medium.

The concentration of oxygen molecules in the sensor membrane, i.e. also the partial pressure of oxygen, is in equilibrium with the oxygen concentration or the oxygen partial pressure in the measuring medium. In the measurement process, a first light signal with at least one corresponding first wavelength is initially emitted to excite the luminophore molecules via the light source.

If the light signal impinges on the luminophore molecules, they are excited and emit luminescence radiation which can be detected by the sensor unit 1 in the form of a second light signal.

If oxygen molecules are present in the sensor membrane, they interact with the luminophore molecules and influence the emission of the second light signal (e.g. different intensity, different phase angles, or different decay time). Thus, for example, energy is transmitted to the oxygen molecules via the second light signal. The intensity of the second light signal thereby decreases. This effect is also referred to as "quenching", and the oxygen molecules are thereby what are known as "quenchers."

The intensity, phase angle, or decay time of the second light signal is dependent on the concentration of quencher molecules. Of course, not only oxygen molecules but also other molecules can be determined in this manner, depending on which luminophore is used.

A fluorescent agent can especially serve as luminophore, but a phosphorescent agent can also be used in an analogous manner, so that here a phosphorescence quenching is effected by quenching.

The optochemical sensor unit shown in FIG. 1 has a sensor housing 2. This sensor housing 2 is connected via a signal line 3 to an evaluation unit 4, which is preferably embodied as a measuring transducer.

The evaluation unit 4 is connected to a control unit 5. However, the evaluation unit and control unit can also be realized as one unit. The optochemical sensor unit 1 can have a coupling point along the signal line 3 for coupling to an evaluation unit 4.

The optochemical sensor unit 1 has a transmitting unit 6. This transmitting unit 6 has a light source 7 for emitting an optical signal, which light source 7 can comprise an LED, for example. Furthermore, the optical sensor has a receiving unit 8, which can comprise a photodiode, for example, for receiving the changed optical signal, for example the second optical signal emitted by the luminescence dye (indicator dye) and influenced by luminescence quenching, and for converting the optical signal into a current- and/or voltage-equivalent measured value. In FIG. 1, in a compact design the receiving unit 8 is combined with the transmitting unit 6 to form a transmitting and receiving unit.

The optical sensor 1 has a sleeve-shaped housing section 9 which is connected to the receiving and transmitting unit 6. An optical guide 10 or optical waveguide is routed within the housing section 9. The optical waveguide 10 directs the optical signal from the light source 7 to a sensor membrane 11, or from the sensor membrane 11 to the receiving unit 8.

Furthermore, an adjusting unit 12, preferably a regulating unit, for adjusting an electromagnet can be arranged within the housing section 9.

Both the adjusting unit 12 and the receiving and transmitting unit 6 can be connected directly or indirectly to the evaluation unit 4, for example via a sensor coupling 27.

The optical sensor 1 has a magnet, preferably an electromagnet 14, preferably on the end face. The electromagnet 14 is operated with current via the adjusting unit 12, wherein the reference current is adjustable via the adjusting unit 12. The electromagnet 14 may be activated in a first operating state and deactivated in a second operating state.

The sensor membrane 11 is arranged on the end face of the housing section 9 and, at the same time, forms a wall section of a measuring chamber 15. The housing section 9 is a structural unit of the sensor housing 2 which can be detached from the supply and discharge lines 16, 17. The measuring chamber 15 is provided to receive a fluid 50, preferably a liquid comprising an analyte and magnetic and/or magnetizable microspheres 30, which are also referred to below as beads. These magnetic microspheres 30 are in particular ferromagnetic. Magnetizable microspheres are also to be understood as magnetic microspheres in the sense of the present disclosure.

Figure 4A:
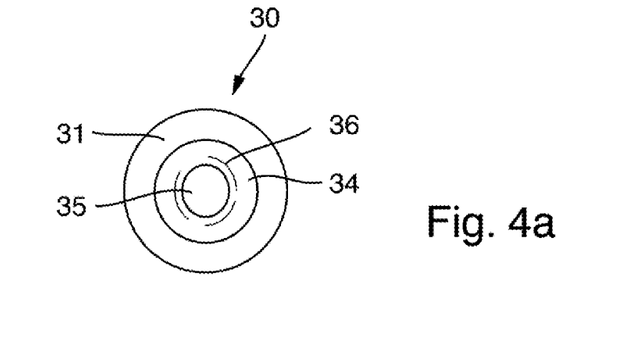
FIG. 4a shows a schematic representation of a first variant of an inserted microsphere.
Figure 4B:
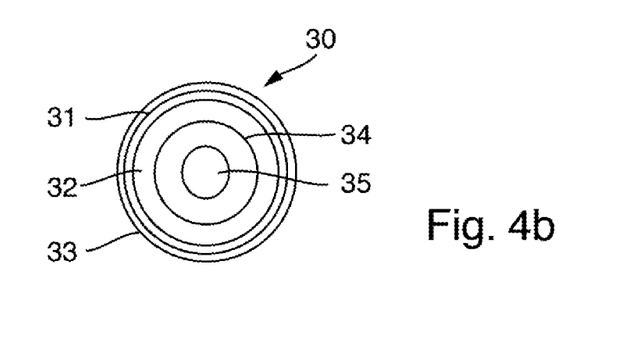
FIG. 4b shows a schematic representation of a second variant of an inserted microsphere.

The fluid may additionally comprise at least one indicator and/or at least one catalyst. The catalyst and/or the indicator can respectively be freely suspended in the solution, or in some instances may also be also embedded in the magnetic microspheres 30. Two embodiment variants of the magnetic microspheres 30 are schematically illustrated in FIGS. 4a and 4b. In FIG. 4a, the microsphere 30 comprises a core 35 of magnetic material, e. g., iron oxide, encased by a capsule material 36. This capsule material 36 represents the microsphere and is coated with a plurality of functional layers 31-34. An outer layer is formed as an enzyme layer 31 comprising an enzyme for converting the analyte. An intermediate layer is designed as reflector layer 34.

FIG. 4b shows an alternative microsphere 30 with a core 35 of magnetic material, e. g., iron oxide, encapsulated with capsule material. An outer layer is formed as a cover layer 33, for example, for protecting the underlying layers from mechanical and/or chemical effects, for example from hydrolysis. A layer adjacent thereto is formed as an enzyme layer 31 comprising an enzyme for converting the analyte. Arranged adjacent thereto is an indicator layer 32 comprising at least one luminophore. A reflector layer 34 is then arranged between the reflector layer 34 and the capsule material of the microsphere 30 encasing the core 35.

The indicator layer 32 of the microsphere 30 and the analyte-sensitive layer 101 of the sensor membrane can preferably be constructed from the same material.

Preferably only the magnetic constituents are encapsulated in the capsule material 36, preferably natural substance capsules, for example exines. The reflection layer or reflector layer 34 is preferably arranged outside of the encapsulation material 36, wherein the encapsulation material is adjacent to the reflection layer. The indicator layer 32 and in some instances an enzyme-containing layer or the enzyme layer 31 are arranged on the reflection layer 34. The enzyme-containing layer or enzyme layer may contain platinum particles. A layer with platinum particles for converting the analyte may also be provided as an alternative to the enzyme layer. Of course, intermediate layers and cover layers, for example the cover layer 33, are additionally possible.

Figure 5A:
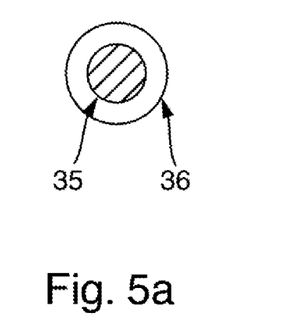
FIG. 5a-5c shows a schematic representation of the distribution of magnetic material within a microsphere.
Figure 5B:
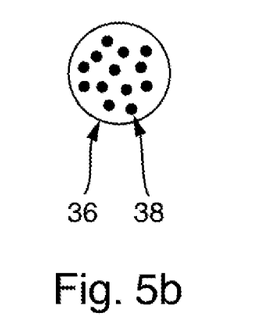
Figure 5C:
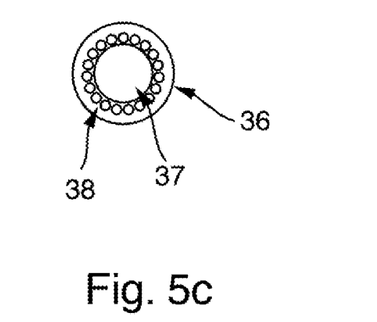

The magnetic substance in the microsphere 30 can be distributed in different ways. This is schematically illustrated in FIGS. 5a-5c. FIG. 5a shows a concentration of the magnetic material in a core 35. In addition, the microsphere has the capsule material 36 of a microsphere which encapsulates the magnetic core.

In the variant of FIG. 5*b*, the magnetic particles 38 are arranged in a distributed manner within the capsule material 36.

In FIG. 5*c*, magnetic particles 38 are arranged as a coating around a polymer core 37. The coated polymer core 37 is encapsulated with capsule material 36 to form a microsphere.

The encapsulation material 36 may be coated with further layers, such as layers 31-34.

The measuring chamber 15 is arranged in a medium-tight manner relative to the housing section 9 and can be filled and/or emptied via a supply line 16 and a discharge line 17. At least one valve can respectively be arranged along the supply line 16 and the discharge line 17. In the exemplary embodiment of FIG. 1, a valve 18 is respectively provided on the supply and discharge lines 16 and 17, and in addition a respective tap 13, e.g., a selector valve, is provided along each of the two lines for optimum circulation.

A solvent 25 in particular can be supplied via the supply line. In some instances, the solvent 25 may also already contain the indicator and/or the catalyst. A metering unit 19 is arranged along the supply line 16, by means of which metering unit 19 the microspheres and, if not already present in the solvent, optionally also the catalyst and the indicator can be metered in. A thorough mixing within the measuring chamber 15 is preferred. For this purpose, the sensor can have a mixing device which, in the present instance, can be a permanent magnet 26, colloquially referred to as a magnetic stir bar, which can be operated by an agitator device, for example via the electromagnet 14. However, it is also conceivable to arrange the agitator device outside of the measuring chamber 15, wherein the microspheres themselves serve as magnets and enable a thorough mixing.

On the side opposite the sensor membrane 11, the measuring chamber 15 is delimited by an analyte-permeable membrane 20. In the intended use, this membrane 20 is arranged in a medium-contacting manner relative to the actual measuring medium 21. Apart from the analyte, it is preferably impermeable to the components located in the measuring chamber, including the microspheres, the indicator, and the catalyst.

The sensor membrane 11 itself is likewise magnetizable. The sensor membrane 11 can have a flat coil 22 for this purpose. The flat coil can have a variety of shapes; for example, it can be designed as a spiral or rectangular coil.

Figure 3A:
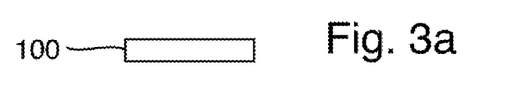
FIG. 3a shows a schematic representation of a first variant of a sensor membrane.
Figure 3B:
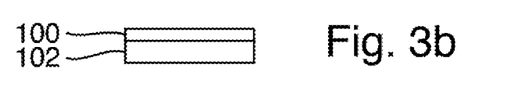
FIG. 3b shows a schematic representation of a second variant of a sensor membrane.
Figure 3C:
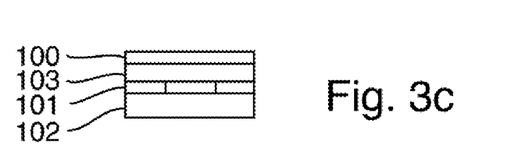
FIG. 3c shows a schematic representation of a third variant of a sensor membrane.
Figure 3D:
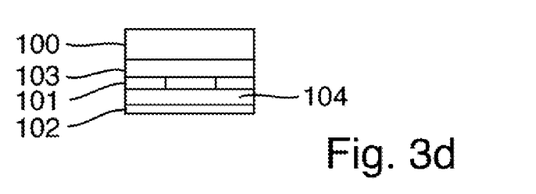
FIG. 3d shows a schematic representation of a fourth variant of a sensor membrane.

The design of a sensor membrane 11 is handled in greater detail in FIGS. 3*a*-3*d*, wherein FIGS. 3*a* and 3*b* show preliminary stages of a sensor membrane, and only FIG. 3*d* shows a finished sensor membrane.

The sensor membrane is preferably of multilayer construction with a plurality of superimposed layers. These define a stacking direction. The sensor membrane can be mounted fixed or be arranged in the measuring chamber 15 so as to be replaceable.

The sensor membrane 11 can have a transparent or translucent wall as a substrate layer or substrate 100. The substrate can, for example, consist of silicon oxide or alternatively of titanium oxide, tungsten oxide, zinc oxide, tin oxide, vanadium oxide, and/or gallium oxide.

An analyte-sensitive layer 101, comprising a luminophore, can be arranged on the substrate 100 in the stacking direction towards the medium.

On the analyte-sensitive layer 101, the sensor membrane may have a fluid contacting layer 102 for contacting the fluid 50 in the measuring chamber 15. Depending on the field of application, this fluid-contacting layer 102 may have a polarity; for example, the layer 102 may designed to be superhydrophobic, hydrophilic or omni-phobic.

Further layers (not depicted) may also be present. This applies, for example, to at least one reflection layer, diffusion layer, and/or an optically insulating layer which may be arranged between the fluid-contacting layer 102 and the analyte-sensitive layer 101.

An adhesion promoter layer can respectively be arranged between the aforementioned layers. In FIG. 3*c*, for example, such a layer 103 is arranged between the substrate 100 and the analyte-sensitive layer 101.

A layer having a second magnet, e.g., an electromagnet 104, is arranged in the sensor membrane between the analyte-sensitive layer 101 and the fluid-contacting layer 102. The electromagnet 104 can preferably be designed as a flat coil, e.g., as a planar coil, and thus be part of the sensor membrane 11.

In the measuring principle of the sensor 1 according to the present disclosure of FIG. 1, the microspheres can be brought into contact with the surface of the sensor membrane 11 by activation, e.g., induction, of a magnetic field. In this instance, the magnetic microspheres are attracted by the electromagnet 104 so that a local concentration of the microspheres along the sensor membrane 11 occurs. Only after the magnetic field is established is a reproducible, interference-free measurement possible, even given low power consumption.

All possible measurement methods that can be used in the optical measurement method, such as the determination of the decay time, phase angle displacement, intensity change, and absorption changes, are suitable as measurands for evaluation.

Parameters to be determined by the sensor 1 are preferably parameters such as glucose, lactose, and/or alcohol, which for measurement require enzymes for conversion into a substance detectable by the sensor, such as oxygen. The substance detectable by the sensor is also referred to as a sensor-active substance. Enzymes typically experience an aging given stressing at high temperatures in a water-containing environment over longer periods of time, which leads to degradation (hydrolysis) especially of the protein structure.

By incorporating the enzymes that are used into the microspheres, a higher hydrolysis stability of the enzymes is achieved. In a preliminary step, the incorporation can take place even before the microspheres are inserted in the sensor.

It can therefore be advantageous if the sensitive enzymes can either be stored outside the main stress zone, or be supplied back to the process, or be regenerated and supplied back, which is made possible by the present sensor according to the present disclosure.

In the embodiment variant of the sensor 1 with a sensor membrane according to FIG. 3*c*, a flat coil can be mounted in the sensor membrane 11 or, alternatively, may be surface-mounted on the surface of the sensor membrane or the transparent or translucent wall. A corresponding flat coil can thus, for example, be applied as a spiral structure or a rectangular structure. In this instance, it is to be noted in the embodiment that a sufficiently active measuring surface is available for signal conduction, since the structures applied are not transparent.

Ideally, therefore, the structure can be applied in the edge region of the sensor membrane and optimally cover only small areas in the actual measuring region of the analyte-sensitive region of the sensor membrane 11.

The coil material can be arranged directly on the substrate, introduced into the sensor membrane, or applied onto the membrane surface. Ideally, the structural design of the coil does not influence the light response signal.

What are known as flat coils can be a planar spiral coil, a planar wandering coil, a three-dimensional wandering coil, and/or a helical coil.

The coil can be located directly in front of the optical waveguide of the sensor, or on the side of the substrate of the sensor membrane that faces away from the medium, or on the medium-facing side of the substrate of the sensor membrane, or in another intermediate layer of the sensor membrane, or on the medium-contacting surface of the sensor membrane, in the direction toward the measuring chamber 15.

The electromagnet 104, in FIG. 3c in the form of the flat coil, can additionally be contacted with the substrate insofar as that it is conductive, for example if indium tin oxide layer or conductor traces are present on or in the substrate. These layers can be sputtered, for example.

Alternatively or additionally, the electromagnet 104 can also be operated by the induction current of a second coil, for example also the coil 14.

As an alternative to the sensor 1 shown in FIG. 1, instead of the sensor membrane 11, it is also possible to provide only an optical waveguide with a terminal medium-contacting surface, e.g., an end surface, or an optical waveguide having a substrate 100 (variant FIG. 3a) with medium-contacting surface, an optical waveguide having a substrate 100 and an analyte-sensitive layer 101 (variant FIG. 3b) with medium-contacting surface, or an optical waveguide having a substrate 100, an analyte-sensitive layer 101, and the fluid-contacting layer 102 (variant FIG. 3c) with a medium-contacting surface. However, the medium-contacting surface of the optical waveguide or the analyte-sensitive layer comes in contact, not with the measuring medium 21, but rather with the fluid 50 in the measuring chamber 15 during operation of the sensor.

In the aforementioned alternative variants, an electromagnetic device or an electromagnet, for example, in the form of a coil, can be arranged in or around the optical waveguide. A magnetizable fiber or a wire, e.g., one or more ferromagnetic fibers, can thereby be used, which are arranged between fibers of the optical waveguide or are wound around an optical waveguide.

A coil can be arranged along the optical waveguide 10, for example, a bundle of light-conducting fibers, on an end of the optical waveguide 10 facing toward the medium. As already discussed above, it is also not absolutely necessary to use a sensor membrane 11; rather, the optical waveguide can likewise have a fluid-contacting surface along which an electromagnet can be arranged.

Of course, both the electromagnet 104 within the sensor membrane 11 and the additional electromagnet 14 can be provided to attract the microspheres, or respectively also only one of the two aforementioned electromagnets.

The measuring chamber 15 is designed such that an exchange of analyte is possible via the shown analyte-permeable but microsphere-impermeable membrane 20. An exchange system enables the exchange of aged microspheres.

Optimally, the measuring chamber 15 has an agitation device for homogenizing the solution in the measuring chamber, preferably with the electromagnet 104 deactivated. Here, the permanent magnet as part of a magnetic agitator represents merely one embodiment variant for realizing an agitation device. In addition, other agitation devices, for example mechanical agitation devices, can also be used.

Centrifugal agitation units or levitators can also be used as mixing apparatuses. Measuring devices can monitor the speed of agitation, for example by flow measuring devices.

With regard to the microspheres, a plurality of variants for the sensor 1 are conceivable, wherein structural details can vary with the type of microspheres.

In a first embodiment variant of the sensor 1, the sensor membrane 11 having at least one substrate 100 and one analyte-sensitive layer 101 can be in direct contact with the optical waveguide 10 so that an analyte, for example oxygen, can be measured. In this instance, however, the analyte is only a product or starting material of a chemical reaction which indirectly detects the analyte that is actually to be determined. For example, an enzyme may be provided which releases or consumes oxygen in a chemical reaction. Glucose oxidase (GOx or GOD) oxidizes glucose to glucolactone and hereby reduces the oxygen proportion in the system. The measurement of glucose can take place as an oxygen reference measurement. The loss of oxygen is accompanied by the glucose concentration. The enzyme is hereby not so stable chemically that only the enzyme is contained in the microspheres in this instance. In this first embodiment variant, only the enzyme in the magnetic microspheres is arranged in the measuring chamber 15 integrated in the sensor 1.

Figure 2A:
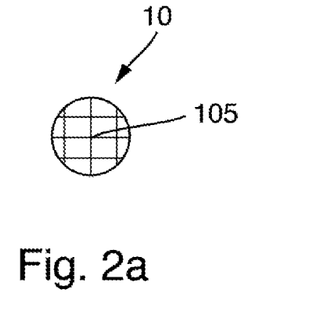
FIG. 2a shows a schematic representation of a modification of the optochemical sensor of FIG. 1.
Figure 2B:
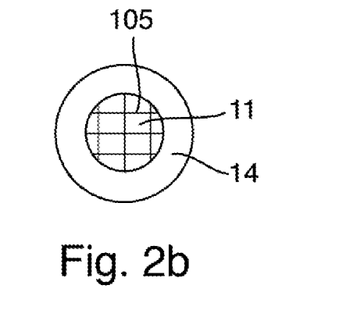
FIG. 2b shows a schematic representation of the optochemical sensor of FIG. 1.

FIG. 2b shows a corresponding variant with an arrangement as a section through a layer of the sensor membrane 11. In this instance, the electromagnet 14 is provided for generation of the magnetic field to attract the microspheres, and a metallic grid 105 serves to conduct the magnetic field along the layer of the sensor membrane 11. This can, for example, be arranged in the medium-contacting layer 102 of the sensor membrane 11.

In a second embodiment variant, the sensor 1 has only the substrate 100 as a sensor membrane 11. In this instance, the microspheres contain the indicator, for example, a luminophore, which in the first embodiment variant is located in the analyte-sensitive layer 101, and which in the second embodiment variant detects the analyte already in the fluid in the measuring chamber 15.

In a third embodiment variant, the sensor 1 has only the substrate 100 as sensor membrane 11. In this instance, the microspheres contain the indicator and the enzyme, which can be encapsulated jointly or respectively by themselves in microspheres, so that microspheres with the encapsulated enzyme and microspheres with encapsulated indicator can be used, and in this instance the analyte content can be determined indirectly as described with reference to the first embodiment variant. "Indirectly" thereby means that the enzyme degrades the actual analyte, and the analyte is then detected only via the change in a degradation product, such as the change in the oxygen content. Two measuring cells or two sensors are also conceivable for a reference measurement, e.g., one for oxygen without the analyte and one for the analyte, for example for glucose, by determining the differential content of oxygen.

Common to all microparticles or microspheres used in the variants described here is that they have magnetic substances (internal to the microsphere) and overlying thereon a) an enzyme, b) an indicator dye, c) an enzyme, and a dye. By applying an electrical voltage to the electromagnet in the sensor, the microspheres can be attracted and optically measured.

The reference measurement can be made by a reference sensor. The reference sensor may also be a simple optical oxygen sensor or DO sensor (dissolved oxygen sensor). In the event of two separate microsphere types, the ratio between microspheres with the indicator layer to microspheres with the enzyme layer can be selected such that substantially more microspheres are present with the enzyme layer, wherein the number of these microspheres is at least 50% higher, preferably twice as high, as that of the indicator layer microspheres. Thus, three preferred variants for the microspheres are obtained:
   a) sensor having a membrane, which sensor comprises the indicator and microspheres with an enzyme layer in the fluid;
   b) sensor having a transparent or translucent wall and microspheres with an indicator layer in or on magnetic microspheres in the fluid;
   c) sensor having a transparent or translucent wall and microspheres with an enzyme layer and indicator layer in the fluid.

The aforementioned electromagnet 104 or the electromagnet 14 for attracting magnetic microspheres may be formed as a coil. This coil may be made of a diamagnetic, paramagnetic, and/or superparamagnetic material, such as iron, cobalt, nickel.

The optical waveguide fiber bundles can also be mixed with magnetic components. Ferroelectric materials, such as insoluble nickel, cobalt, and/or iron salts, rare earth magnets such as neodymium iron boron, samarium cobalt, samarium iron nitrogen alloys, strontium ferrites, or other ferritic materials, can also be present in the optical waveguide, for example as thin hollow tubes or fibers.

FIG. 2a shows an arrangement of a metallic grid 105 within an optical waveguide 10, so that the magnetic field extends across the cross section of the optical waveguide 10. A magnetic coil that can be arranged outside the optical waveguide 10 is not shown in this instance.

The aforementioned materials can thus be arranged in or along the optical waveguide. Ideally, the arrangement should be such that the optical properties of the optical waveguide are not disadvantageously impaired.

For this purpose, the substances can be colored black, for example, or the optical fiber bundles are adhesively bonded with a black adhesive. Given the use of fiber bundles consisting of optical waveguides and magnetic fiber material, although the optically active area of the optical waveguide is reduced, the magnetic effect on the sensor beads in the solution increases.

In the illustrated embodiment variant, the sensor membrane 11 can be an ordinary membrane of an optical oxygen sensor that can have a layer comprising a luminescent dye, e.g., a fluorescent dye, and an optical insulator. The optical insulator can, for example, be provided in a further layer.

The magnetic microspheres can be natural substance-based capsules which, for example, are cell walls of algae, for example diatoms, or the exines of pollen, or which can be obtained from spores, for example fungal spores. Alternatively, they can also be capsules based on a synthetic polymer such as polystyrene divinylbenzene and derivatives thereof. These capsules can then be loaded with iron oxide.

In the above-described second or third embodiment variant, instead of the sensor membrane 11, a substrate composed of a transparent material such as quartz glass or borosilicate glass, sapphire, or a plastic can be used.

As previously described, the microspheres may be natural-based or synthetic polymer-based capsules.

In the event of the second embodiment variant, they contain both the magnetic components, for example, in the form of iron oxide, and also the luminophore, for example, a fluorescent agent, and optionally an optical insulator if the microsphere itself does not act like such.

The microsphere can likewise optionally comprise an enzyme, for example, glucose oxidase, which can preferably be provided in the outer region of the cavity. One possibility for arranging the enzyme on the microsphere is a coating. If necessary, this enzyme layer can also be coated with a water-permeable polymer, such as at least one polyvinylcarbazole, a crosslinked or un-crosslinked polyacrylamide, a polymethacrylate, a hydromethylcellulose, a polyethylene glycol, and/or a polyvinylpyrrolidone, or derivatives of the aforementioned compounds. This outer polymer layer can serve to produce a membrane on the surface of the microsphere and can preferably be designed to be permeable to glucose.

The magnetic microspheres that are used can be of different design.

Various illustrations of microspheres are shown in FIGS. 4 and 5. For the production of capsules for the microspheres, a method can be used which includes swelling and precipitating into a solvent, and evaporation of the solvent, spray drying, liquid encapsulation, or core shell encapsulations.

An example of the preparation of various microspheres is listed below.

In order to prepare microcapsules, for example exines, for encapsulating magnetic substances, labile fluorescent materials such as proteins, lipids, nucleic acids, and carbohydrates must be extracted from starting materials such as spores. For this, *lycopodium clavatum* spores (250 g) can be suspended in acetone and boiled under reflux for 4 hours. The dispersion is centrifuged and the supernatant is decanted. The defatted spores are stirred in 4% potassium hydroxide solution under reflux overnight (basic hydrolysis), then filtered, washed neutral with hot water, and then washed colorless with ethanol. The base hydrolyzed sporopollenins are then dried overnight in the desiccator on phosphorus pentoxide. 150 g of the product thus obtained are suspended in orthophosphate solution (85%, 600 ml) and stirred under reflux for one week (acidic hydrolysis). The defatted, base- and acid-hydrolyzed sporopollenins are filtered, washed neutral with water, and washed again with hydrochloric acid (200 ml), acetone (200 ml), and ethanol, and heated under reflux for 1 hour, filtered again, and dried in a desiccator with phosphorus pentoxide. The resulting exine is then treated with sodium hypochlorite in order to obtain bright microspheres for optical applications. The pretreated exines (5 g) are stirred in a 10% sodium hypochlorite solution (250 ml) at 60° C. for 2 hours and, after being cooled, are filtered off and washed neutral with deionized water (approx. 1 liter). The exines are then washed with acetone (3×200 ml) and ethanol (3×200 ml) and dried in a desiccator.

The microspheres are then loaded with iron oxide and/or enzymes and/or indicator dye, for example a fluorophore, or a reference dye, for example a phosphorophore.

Admixed to a water-ethanol solution (9:1, 50 ml) are 10 g of an iron (III) chloride and 20 g of iron (II) chloride tetrahydrate and 5 ml of hydrochloric acid (3M), and then 0.4 g of exines are added. The dispersion is stirred vigorously for approximately 30 min at 45° C., filtered and washed with deionized water, and then 25 ml of a 1M ammonia solution are added. After 2 hours, the solution is filtered off and washed with deionized water. After drying in the desiccator, the capsules loaded with magnetic particles are added by drops to a 10% aqueous solution of glucose oxidase and bovine serum albumin (ratio 1:2 v/v) in a 1% aqueous glutaraldehyde solution, and exines are added to this solution. The dispersion is stirred at room temperature for approximately 1 hour and then filtered and freeze-dried.

Optionally, the microspheres can also be loaded with a luminophore, for example an indicator dye or reference dye, preferably with a fluorophore or a phosphorophore.

In the context of the present disclosure, different optical measurement methods are considered for determining the analyte concentration, for example the measurement of the phase angle shift, the decay time, and/or the intensity change. A concentration can be determined with a fluorophore via the intensity change. The other two methods can preferably use a phosphorophore in low power sensors. For certain measurements of ionic substances, a fluorophore is typically used as an indicator and a phosphorophore is used as a reference dye, for example for determining the pH value or an ion concentration.

The encapsulation of a luminophore is explained in more detail below with reference to an example:

Ruthenium tris(4,7-diphenyl-1,10-phenanathroline) trichloride (10 mg) is incorporated into dichloromethane (2 ml) and exines (1 g) of the batch and stirred on a magnetic agitator for approximately 2-3 min. The dispersion is then slowly added by drops into water and stirred for a further 2-3 min. The exines are then filtered and dried. The encapsulation efficiency can be determined by weight gain or analytically by means of extraction and HPLC. The hollow bodies thus produced are dried in the desiccator and then dispersed with ethanol/THF/water (80:10:10) and iron oxide, and are encapsulated and collected by spraying with a spray gun into a preheated beaker.

The aforementioned example is merely one possibility for encapsulation. Microspheres that are markedly more complex can also be realized. For such a more complex microsphere, the sensor components can be introduced into the microspheres via successive encapsulation. An optimally high intensity can be detected by the sensor by means of the different layers.

At the same time, the microspheres can be freely attracted by the electromagnet, so that a rapid, reproducible measurement is possible.

During production, a magnetic microsphere can first be provided onto which the further layers can then gradually be applied.

The plurality of variants of the microspheres will be explained in more detail below. Initially, unloaded capsules are provided. The following steps can then be performed:
A) Loading with magnetic components, for example according to the example described above
B) Optionally: Deposition of a reflective layer, preferably comprising $TiO_2$, $ZrO_2$, or $BaSO_4$
C) Optionally: Application of a separation layer as a layer for preventing particle migration of particles on the analyte-sensitive layer (D) into lower layers
D) Application of the fluorescent dye or the analyte-sensitive layer with the fluorescent dye
E) Optionally: Application of a diffusion barrier and/or a hygienic layer,
for example by spraying and/or dipping, for example into a diluted silicone polymer solution The formation of the aforementioned separation layer can take place as follows, for example: Titanium tetraethanolate (also known as titanium ethoxide) can be used as precursor, since $TiO_2$ is substantially insoluble. Emulsion polymerization can be used for the coating. Addition of water initiates crosslinking. The formed $TiO_2$ then forms an insoluble sub-layer on the capsule material of the microcapsule. $ZrO_2$ can be applied in a similar manner. A precipitation reaction can be used to apply barium sulfate. Here, BaCl2 and H2SO4 can be reacted.

Silicone, Teflon AF, Hyflon, and/or polyurethane can be used as the diffusion barrier layer, especially for ionic analytes.

For the incorporation of enzymes, polar substances such as polyacrylates, polyethylene glycols (PEG), and/or polyvinyl alcohols (PVA) can be used.

TV silicones and/or polyurethane (PUR), among others, can be used as a hygienic layer.

A further variant for the production of loaded microspheres is described below. Initially, unloaded capsules are provided. The following steps can then be performed:
A) Loading with magnetic components, for example in accordance with the example described above
B) Application of a reflection layer, for example a layer containing TiO2-, ZrO2-, and/or BaSO4, in which is contained a luminophore, for example a fluorescent dye. Alternatively, an analyte-sensitive layer may be applied.
C) Optionally: Application of a diffusion barrier or a hygienic layer, for example by dipping into a diluted silicone solution (hexane as solvent) or into a fluoroalkylsiloxane solution Various variants of the embodiment of the membrane 20 will be explained in more detail below.

For example, the membrane 20 is formed from a polymer membrane that is permeable to the analyte. In this example, the membrane 20 is connected to the remaining sensor housing. However, a plurality of alternative embodiments are possible. For example, the membrane 20 can also be formed as a porous wall of the sensor housing, for example by a wall region which has one or more through-holes, for example nanoholes, and which terminates the measuring chamber 15. Alternatively, the membrane 20 can also be formed by a wall or layer of a porous and/or ion-conducting substance that terminates the measuring chamber 15, for example a molecular sieve, a zeolite material, a ceramic, an ion exchanger, a proton conductor, an MOF (metal organic framework), and/or a ZIF (zeolitic imidazolate framework). The membrane 20 may be formed integrally with the sensor housing 2 or may be fixedly connected to the sensor housing.

Figure 6A:
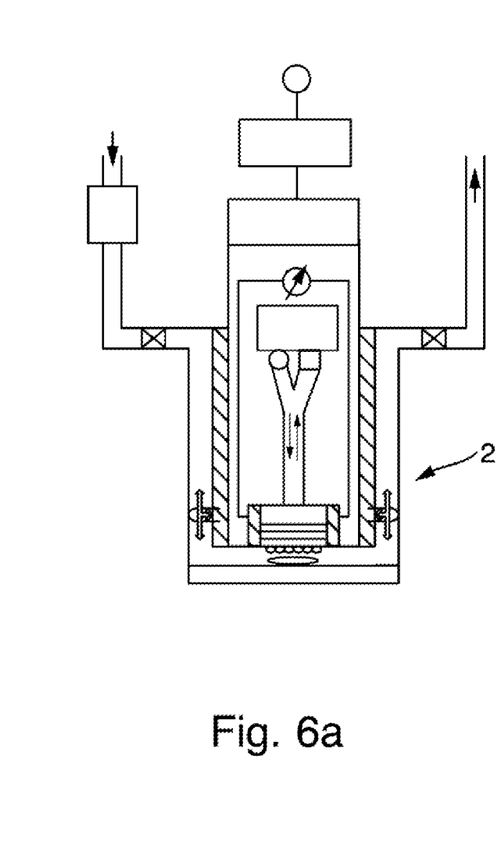
FIG. 6a-c shows a representation of various modified variants of a sensor according to the present disclosure.
Figure 6B:
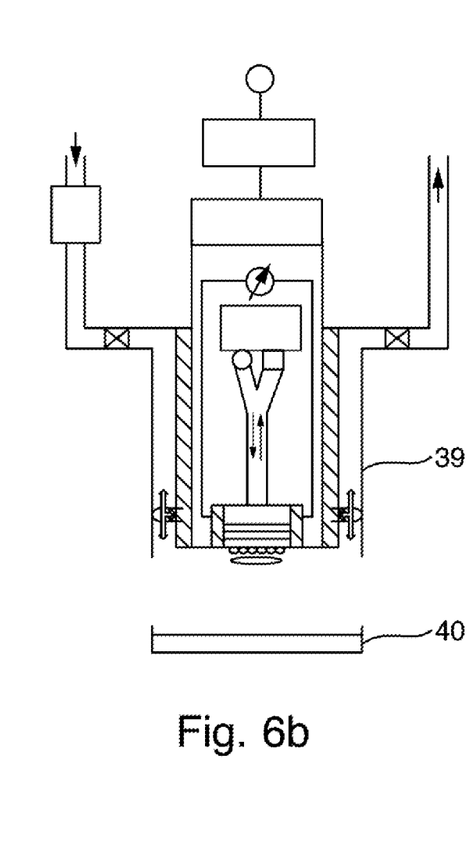
Figure 6C:
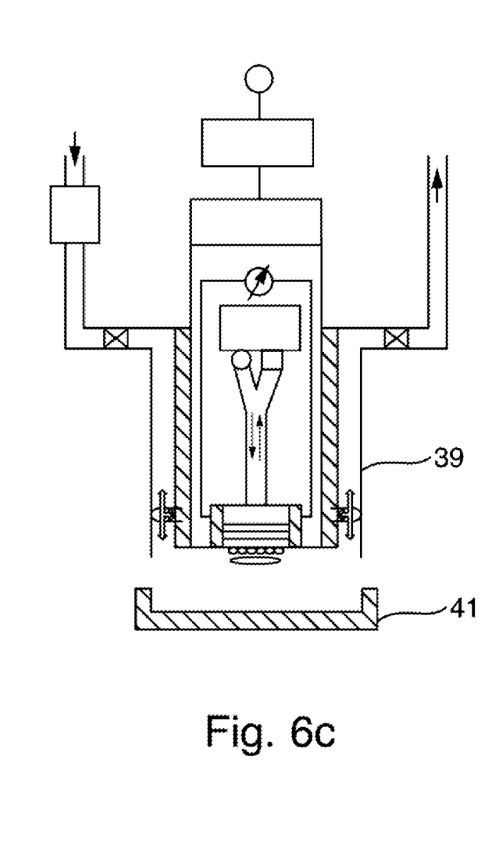

FIGS. 6a-6c show different variants of a sensor 1. According to FIG. 6a, it can be constructed in one piece, as has also already been illustrated in FIG. 1.

However, the membrane 20 can also be a component of a membrane cap 40 which can be connected to a housing body so as to be detachable, as was indicated schematically in FIG. 6b. In this embodiment, a housing body 39 and the membrane cap 40 together form the sensor housing 2 and the measuring chamber 15, and the membrane cap 40 terminates the sensor housing 2 and the measuring chamber 15 formed therein in the direction of the measuring medium. The membrane cap 40 is thereby slipped onto the rest of the sensor housing 2.

If the membrane 20 is formed from a porous material, for example, a porous ceramic or zeolite, as shown in FIG. 6c, it can be formed in the form of a cap 41 partially or entirely made of the porous material, which is connected, for example by a plug or screw connection, to the remaining housing body 39 so as to be detachable, so that the cap terminates the measuring chamber 15 on the side of the measuring medium.

In this embodiment, a rapid analyte exchange is possible between the measuring fluid and the indicator contained in the measuring chamber. It is hereby advantageous if the auxiliary substances possibly contained in the indicator solution cannot pass through the membrane 20 in the direction of the measurement medium. The porous ceramic can be externally provided with an analyte-selective polymer coating, and/or internally with a deposit-repellent coating.

Optionally, the ceramic may contain polymers which act selectively with respect to the analyte, such as specific acrylamides and/or hydroxycellulose. The separation generally takes place via size exclusion.

In general, the membrane 20 should be protected from interfering substances such as proteins or dye molecules. However, in a preferred embodiment the medium-contacting membrane 20 can therefore also already be analyte-selective. However, this is not necessarily predetermined within the meaning of the present disclosure.

In the simplest instance, almost everything that is also present in the measuring medium is present in the measuring chamber, with the exception of large abrasive materials or materials which tend to block the membrane 20 and/or may cause a falsification of the measurement. The membrane 20 is intended primarily to prevent the magnetic microspheres/beads from escaping from the measuring chamber 15. The term analyte-selective is to be understood as an additional function of a coarse particulate and/or substance filter.

Various variants of the embodiment of the measuring chamber 15 will be explained in more detail below.

The optical sensor unit 1 may comprise at least one optical waveguide for guiding radiation emitted by the transmitting unit or the radiation source into the measuring chamber 15, and for guiding luminescence radiation from the measuring chamber 15 to the receiving unit.

Via a first fluid line, the supply line 16, the measuring chamber 15 can be fluidically connected to at least one reservoir arranged outside the measuring chamber 15, which reservoir contains magnetic microspheres loaded with indicator and/or enzyme. The reservoir may be provided as part of a metering unit 19. The measuring chamber 15 can be fluidically connected to a second fluid line, the discharge line 17. The second discharge line 17 can be connected to a collecting container (not shown in detail) for collecting spent microspheres. In this embodiment, the microspheres present in the measuring chamber 15 can be exchanged at regular time intervals, as needed, or continuously for microspheres from the reservoir of the metering device 19. For this, the sensor unit 1 may comprise means for transporting fluid from the reservoir into the measuring chamber and for transporting fluid from the measuring chamber 15 into the discharge line 17. These means may comprise valves, pumps, sloping fluid conduits, or other means for generating pressure gradients along which fluid can be transported. The at least one reservoir of the metering unit 19 and/or the collection container can be arranged within the sensor housing 2. Alternatively, the reservoir and/or the collection container may be arranged outside of the sensor housing 2. In this instance, the supply line 16 and the discharge line 17 are routed out of the sensor housing 2 in order to fluidically connect the reservoir of the metering unit 19 and/or the collection container to the measuring chamber 15.

Advantageously, the reservoir arranged in the measuring chamber 15 can be fluidically connected to one or more, for example two or three, reservoirs (not shown) arranged outside the measuring chamber 15. Each of the reservoirs may comprise an indicator and/or an enzyme which are bound, preferably encapsulated, within magnetic microspheres. The respective microspheres of the respective reservoirs can differ from one another with regard to the indicator and/or the enzyme. For example, a first reservoir may contain a type of microsphere loaded with an indicator and/or enzyme suitable for determining the concentration of a first analyte, whereas a second reservoir contains a type of microsphere loaded with a second indicator and/or enzyme suitable for determining the concentration of a second analyte different from the first analyte. It is then possible, during operation of the sensor unit 1, to selectively introduce the first or the second indicator and/or catalyst into the measurement chamber 15 in order to determine the concentration of the first or the second analyte by choice or in alternation. In this instance, the membrane 20 is designed in such a way that both the first and the second analyte pass through the membrane 20 into the measuring chamber 15. In addition, in this embodiment the measuring chamber 15 is connected to at least one collecting container for collecting spent indicator and/or catalyst, into which collecting container the indicator and/or catalyst can be discharged from the measuring chamber 15.

Figure 7:
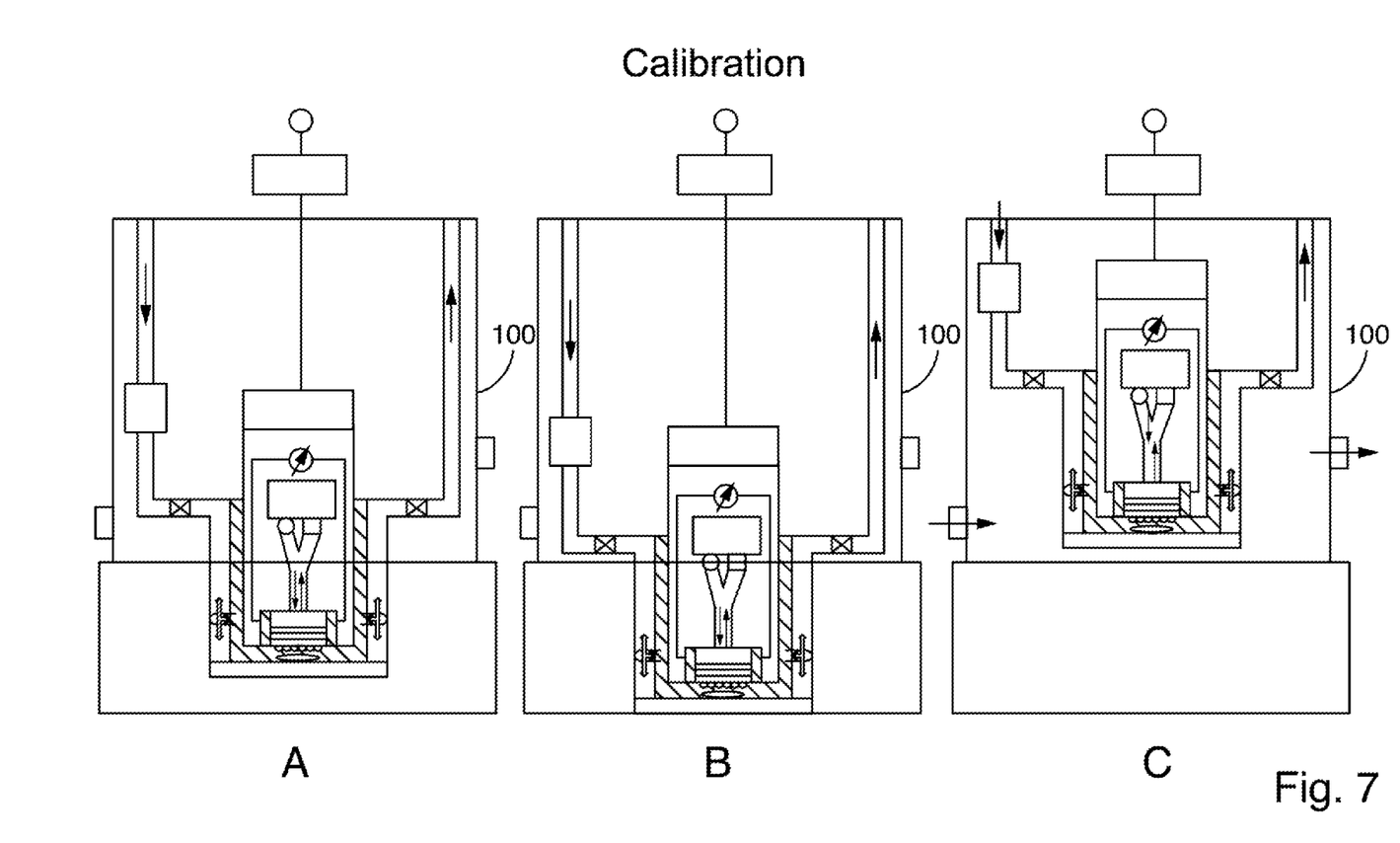
FIG. 7 shows a schematic representation of a calibration of the sensor of FIG. 1, shown in positions A, B, and C.

In addition, the spatially delimited measuring chamber can also be used for calibrating the microspheres, for example, as is shown in FIG. 7, if the analyte-permeable membrane 20 is configured so that it can be mechanically sealed, for example. For this purpose, starting from measuring position A, the sensor unit 1 can be moved from the measuring position A, for example, in which the membrane 20 is located in a container, by return of the sensor unit 1 into a position C within a fitting 200, or by movement of sensor unit 1 out of the fitting 200 until the membrane rests against a flat wall of the opposite side of the container (position B). The container can be, for example, a pipeline or a reaction vessel, for example a fermenter. In the positions B and C shown in FIG. 7, the membrane 20 is temporarily sealed with respect to the measuring medium located in the container. During this temporary sealing of the membrane 20, a standard containing the analyte can be added into the measuring chamber, calibrated and washed, and a new standard added, again calibrated and washed. During washing, the electromagnet 104 may fix the microspheres so that only the calibration solution is exchanged. In this way, it is possible to perform a plurality of calibrations. Optionally, a separate oxygen reference sensor can be provided which can also be arranged in the measuring chamber, and which detects the oxygen content of the solution as a reference value.

The invention claimed is:

1. An optochemical sensor unit comprising:
   an optical waveguide;
   a transmitting unit configured to emit a first transmission signal for exciting a luminophore;
   a receiving unit configured to receive a received signal comprising a signal component emitted by the excited luminophore;
   a measuring chamber configured for receiving a fluid, the fluid including magnetic microspheres;
   an analyte membrane disposed between the measuring chamber and a measuring medium and operative to exchange an analyte between the measuring medium and the fluid in the measuring chamber, wherein the membrane is impermeable to the microspheres;
   a sensor membrane disposed opposite the analyte membrane across the measuring chamber; and
   an electromagnet operative to attract the microspheres to a fluid-contacting surface of the sensor membrane, which is in contact with the fluid in operation, and/or to a fluid-contacting surface of the optical waveguide or a surface of a transparent or translucent wall of the optical sensor unit that is connected to the optical waveguide.

2. The optochemical sensor unit of claim 1, further comprising a control unit configured to control the electromagnet between an activated state and a deactivated state such that the microspheres of the fluid are attracted in the activated state and are not attracted in the deactivated state.

3. The optochemical sensor unit of claim 1, wherein the electromagnet is arranged around the optical waveguide or in a fiber bundle of the optical waveguide.

4. The optochemical sensor unit of claim 1, wherein the sensor membrane has at least a substrate layer and an analyte-sensitive layer including a luminophore.

5. The optochemical sensor unit of claim 1, wherein the electromagnet is arranged in or on the sensor membrane.

6. The optochemical sensor unit of claim 5, wherein the electromagnet is configured as a flat coil.

7. The optochemical sensor unit of claim 5, wherein the sensor membrane includes at least one substrate layer that has a transparent, or translucent, and conductive layer of silicon oxide, indium tin oxide, graphene fibers, titanium oxide, tungsten oxide, zinc oxide, tin oxide, vanadium oxide, and/or gallium oxide.

8. The optochemical sensor unit of claim 5, wherein the transparent or translucent wall of the optical sensor unit that is connected to the optical waveguide includes at least one of silicon oxide, indium tin oxide, graphene fibers, titanium oxide, tungsten oxide, zinc oxide, tin oxide, vanadium oxide and gallium oxide.

9. The optochemical sensor unit of claim 1, wherein the measuring chamber includes an intake and a discharge operative for exchanging the fluid in the measuring chamber.

10. The optochemical sensor unit of claim 1, further comprising an agitation device operative for homogenizing the magnetic microspheres in the fluid within the measuring chamber.

11. The optochemical sensor unit of claim 1, further comprising a metering and/or injection device configured to meter an addition of fluid into the measuring chamber and/or adjust a concentration of the microspheres in the fluid in the measuring chamber.

12. The optochemical sensor unit of claim 1, wherein the microspheres include a magnetic substance in the form of a ferromagnetic material, the material selected from a group consisting of elemental iron, cobalt and/or nickel, nickel salts, cobalt salts and/or iron salts, rare earth magnets, neodymium iron boron, samarium cobalt, samarium iron nitrogen alloys, strontium ferrites, and ferritic materials.

13. The optochemical sensor unit of claim 1, wherein the microspheres include at least one enzyme and/or catalyst operative for converting the analyte into a sensor-active substance.

14. The optochemical sensor unit of claim 1, wherein the microspheres include an analyte-sensitive material operative for detecting the analyte or a substance converted from the analyte.

15. The optochemical sensor unit of claim 1, wherein the microspheres include a capsule layer made of a natural material or a synthetic polymer.

16. A measuring arrangement comprising:
an optochemical sensor unit comprising:
an optical waveguide;
a transmitting unit configured to emit a first transmission signal for exciting a luminophore;
a receiving unit configured to receive a received signal comprising a signal component emitted by the excited luminophore;
a measuring chamber configured for receiving a fluid, the fluid including magnetic microspheres;
an analyte membrane disposed between the measuring chamber and a measuring medium and operative to exchange an analyte between the measuring medium and the fluid in the measuring chamber, wherein the membrane is impermeable to the magnetic microspheres;
a sensor membrane disposed opposite the analyte membrane across the measuring chamber; and
an electromagnet operative to attract magnetic microspheres to a fluid-contacting surface of the sensor membrane, which is in contact with the fluid in operation, and/or to a fluid-contacting surface of the optical waveguide or a surface of a transparent or translucent wall of the optical sensor unit that is connected to the optical waveguide; and
a superordinate unit connected to the optochemical sensor unit, wherein the optochemical sensor unit and the superordinate unit are coupled to each other via a connection, and wherein energy for powering the sensor unit is transmitted unidirectionally from the superordinate unit to the optochemical sensor unit via the connection.

17. The measuring arrangement of claim 16, wherein the connection is a separable, galvanically isolated connection.

18. The measuring arrangement of claim 16, wherein the superordinate unit comprises a data processing unit such that data are transmitted bidirectionally between the optochemical sensor unit and the data processing unit via the connection.

19. A method for qualitative and/or quantitative determination of an analyte in a measuring medium, the method comprising:
a. providing an optochemical sensor unit comprising:
an optical waveguide;
a transmitting unit configured to emit a first transmission signal for exciting a luminophore;
a receiving unit configured to receive a received signal comprising a signal component emitted by the excited luminophore;
a measuring chamber configured for receiving a fluid, the fluid including magnetic microspheres;
an analyte membrane disposed between the measuring chamber and a measuring medium and operative to exchange an analyte between the measuring medium and the fluid in the measuring chamber, wherein the membrane is impermeable to the microspheres;
a sensor membrane disposed opposite the analyte membrane across the measuring chamber; and
an electromagnet operative to attract magnetic microspheres to a fluid-contacting surface of the sensor membrane, which is in contact with the fluid in operation, and/or to a fluid-contacting surface of the optical waveguide or a surface of a transparent or translucent wall of the optical sensor unit that is connected to the optical waveguide;
b. introducing into the measuring chamber the fluid including the magnetic microspheres, wherein the microspheres include at least one means for converting the analyte into a sensor-active substance or an analyte-sensitive material for detecting the analyte or a substance converted from the analyte;

c. introducing the sensor unit into a measuring medium;
d. activating of the electromagnet such that the microspheres accumulate on the sensor membrane at the fluid-contacting surface and/or on the fluid-contacting surface of the optical waveguide;
e. determining a measurement signal while the microspheres have accumulated on the fluid-contacting surface.

20. The method of claim 19, wherein, after a single or repeated sequence of steps b through e, a calibration is performed by introducing the optochemical sensor unit into a fitting or by temporarily sealing the membrane.

21. The method of claim 20 wherein the calibration is performed as an in situ calibration in a pipeline.

* * * * *